(12) United States Patent
Takase

(10) Patent No.: US 7,862,972 B2
(45) Date of Patent: Jan. 4, 2011

(54) TONER BINDER AND TONER

(75) Inventor: Naoki Takase, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 99 days.

(21) Appl. No.: 12/293,181

(22) PCT Filed: Mar. 16, 2006

(86) PCT No.: PCT/JP2006/305251

§ 371 (c)(1), (2), (4) Date: Feb. 19, 2009

(87) PCT Pub. No.: WO2007/108052

PCT Pub. Date: Sep. 27, 2007

(65) Prior Publication Data

US 2009/0220881 A1    Sep. 3, 2009

(51) Int. Cl.
- G03G 9/087 (2006.01)
- C08G 63/00 (2006.01)
- C08G 59/02 (2006.01)

(52) U.S. Cl. ............ 430/109.2; 430/109.4; 528/271; 528/365

(58) Field of Classification Search ............ 430/109.2, 430/109.4; 528/271, 365
See application file for complete search history.

(56) References Cited

U.S. PATENT DOCUMENTS

| | | | |
|---|---|---|---|
| 4,260,735 A | | 4/1981 | Bander et al. |
| 4,788,172 A * | | 11/1988 | Deardorff ............ 502/167 |
| 7,718,339 B2 * | | 5/2010 | Tomita et al. ......... 430/109.4 |
| 2003/0158372 A1 * | | 8/2003 | Shirai et al. ......... 528/279 |
| 2004/0086797 A1 | | 5/2004 | Kubo et al. |
| 2004/0241565 A1 | | 12/2004 | Kishiki et al. |

FOREIGN PATENT DOCUMENTS

| | | |
|---|---|---|
| EP | 1542084 | 6/2005 |
| EP | 1 995 639 | 11/2008 |
| JP | 2003-201342 A | 7/2003 |
| JP | 2004-126545 A | 4/2004 |
| JP | 2004-149660 A | 5/2004 |
| JP | 2004-177607 A | 6/2004 |
| JP | 2004-231831 A | 8/2004 |
| JP | 2005-049826 A | 2/2005 |
| JP | 2005-091525 A | 4/2005 |
| JP | 2005-091883 A | 4/2005 |
| JP | 2005-097580 A | 4/2005 |
| JP | 2005-247965 A | 9/2005 |
| WO | WO-03/073171 A1 | 9/2003 |

OTHER PUBLICATIONS

The Supplementary European Search Report dated Nov. 3, 2009, from corresponding European application No. 06 72 9244.
International Search Report from PCT/JP2006/305251.
Written Opinion from PCT/JP2006/305251.

* cited by examiner

Primary Examiner—Hoa V Le
(74) Attorney, Agent, or Firm—Edwards Angell Palmer & Dodge LLP

(57) ABSTRACT

Disclosed herein is a polyester resin-based toner binder which can impart both excellent anti-blocking property under high temperature and humidity conditions and low-temperature fixing properties to a toner. The toner binder for developing electrostatic images includes a polycondensation polyester resin produced in the presence of at least one titanium-containing catalyst (a) represented by the following general formula (I) or (II):

$$Ti(-X)_m(-OH)_n \quad (I)$$

$$O=Ti(-X)_p(-OR)_q \quad (II)$$

wherein X is a residue formed by removing H of one OH group from a (poly)alkanolamine having 2 to 12 carbon atoms; R is H or a C1 to C8 alkyl group which may have 1 to 3 ether bonds; m is 1 to 4, n is 0 to 3, and the sum of m and n is 4; and p is 1 to 2, q is 0 to 1, and the sum of p and q is 2 (m, n, p, and q are each an integer).

8 Claims, No Drawings

TONER BINDER AND TONER

This application is the U.S. national phase, pursuant to 35 U.S.C. §371, of PCT international application Ser. No. PCT/JP2006/305251, filed Mar. 16, 2006, designating the United States and published on Sep. 27, 2007 as publication WO 2007/108052 A1. The entire contents of the aforementioned patent application is incorporated herein by this reference.

FIELD OF THE INVENTION

The present invention relates to a polyester resin useful for dry toners for use in developing electrostatic images or magnetic latent images in electrophotography, electrostatic recording, electrostatic printing, and the like, and a toner using the polyester resin as a binder.

BACKGROUND ART

It is conventionally known that a polyester resin is used as a binder for the purpose of improving the low-temperature fixing ability of a toner (see, for example, Patent Documents 1 and 2). In order to further improve the low-temperature fixing property of a toner, it is necessary to reduce the molecular weight or glass transition temperature (hereinafter, abbreviated as "Tg") of a polyester resin. However, this involves a problem that resultant toner is poor in anti-blocking property under high temperature and humidity conditions.

Patent Document 1: Japanese Patent Application Laid-open No. S62-178278

Patent Document 2: Japanese Patent Application Laid-open No. H4-313760

DISCLOSURE OF THE INVENTION

Problems to be Solved by the Invention

It is therefore an object of the present invention to provide a toner binder comprising a polyester resin capable of imparting both excellent anti-blocking property under high temperature and high humidity conditions and low-temperature fixing property to toners and a toner using the toner binder.

Means for Solving the Problems

The present inventors have extensively studied to solve the above problem, and as a result, have found that the problem can be solved by using a toner binder comprising a polycondensation polyester resin produced in the presence of a specific catalyst, and this finding has led to the completion of the present invention.

The present invention is directed to a toner binder for developing electrostatic images, comprising a polycondensation polyester resin produced in the presence of at least one titanium-containing catalyst (a) represented by the following general formula (I) or (II); and a toner for developing electrostatic images, comprising the toner binder (A) for developing electrostatic images and a colorant (B):

$$\mathrm{Ti}(-X)_m(-OH)_n \qquad (I)$$

$$O=\mathrm{Ti}(-X)_p(-OR)_q \qquad (II)$$

wherein X is a residue formed by removing H of one OH group from a mono- or poly-alkanolamine having 2 to 12 carbon atoms, wherein in the case of a polyalkanolamine, the other OH group or each of one or more of other OH groups may be intramolecularly polycondensed with another OH group directly bound to the same Ti atom, to which the residue is bound, to form a ring structure, or, alternatively, or simultaneously when two or more of other OH groups are incorporated, may be intermolecularly polycondensed with an OH group directly bound to a Ti atom of another molecule to form a structure containing two or more Ti atoms at a polymerization degree of 2 to 5; R is H or a C1 to C8 alkyl group which may have 1 to 3 ether bonds; m is an integer of 1 to 4, n is an integer of 0 to 3, and the sum of m and n is 4; p is an integer of 1 to 2, q is an integer of 0 to 1, and the sum of p and q is 2; and when m or p is 2 or more, two or more Xs may be the same or different.

Effect of the Invention

The toner according to the present invention using the toner binder according to the present invention comprising a polycondensation polyester resin has both excellent anti-blocking property under high temperature and high humidity conditions and low-temperature fixing property, and also has good storage stability, melt fluidity, and electrostatic properties. Further, a polycondensation polyester resin having good resin properties can be obtained without using a tin compound, which will cause environmental problems, as a catalyst.

BEST MODE FOR CARRYING OUT THE INVENTION

Hereinbelow, the present invention will be described in detail.

A titanium-containing catalyst (a) to be used in the present invention is a compound represented by the above formula (I) or (II), and such compounds may be used in combination of two or more of them.

In the general formulas (I) and (II), X is a residue formed by removing H of one OH group from a mono- or poly-alkanolamine having 2 to 12 carbon atoms, and the number of nitrogen atoms, that is, the total number of primary, secondary, and tertiary amino groups is usually 1 to 2, preferably 1.

Examples of the monoalkanolamine include ethanolamine and propanolamine. Examples of the polyalkanolamine include dialkanolamines (e.g., diethanolamine, N-methyldiethanolamine, and N-butyldiethanolamine), trialkanolamines (e.g., triethanolamine and tripropanolamine), and tetraalkanolamines (e.g., N,N,N',N'-tetrahydroxyethylethylenediamine).

In the case of a polyalkanolamine, one or more OH groups are present other than an OH group to be used for forming a Ti—O—C bond with a Ti atom, and the other OH group or each of one or more of the other OH groups may be intramolecularly polycondensed with another OH group directly bound to the same Ti atom as mentioned above to form a ring structure, or, alternatively, or simultaneously when two or more of other OH groups are incorporated, may be intermolecularly polycondensed with an OH group directly bound to a Ti atom of another molecule to form a structure containing two or more Ti atoms. In the case of the intermolecular polycondensation, a polymerization degree is 2 to 5. If the polymerization degree is 6 or more, catalytic activity deteriorates and oligomers increase in a reactant so that a resultant toner has poor anti-blocking property.

Preferred examples of X include residues of monoalkanolamines (especially, ethanolamine), residues of dialkanolamines (especially, diethanolamine), and residues of trialkanolamines (especially, triethanolamine). Among them, a residue of triethanolamine is particularly preferred.

R is H or a C1 to C8 alkyl group which may have 1 to 3 ether bonds. Specific examples of the alkyl group having 1 to carbon atoms include a methyl group, an ethyl group, an n-propyl group, an isopropyl group, an n-butyl group, an n-hexyl group, an n-octyl group, a β-methoxyethyl group, and a β-ethoxyethyl group. Among them, H and C1 to C4 alkyl groups having no ether bond are preferred, and H, an ethyl group, and an isopropyl group are more preferred.

In the formula (I), m is an integer of 1 to 4, preferably 2 to 4, and n is an integer of 0 to 3, preferably 0 to 2, wherein the sum of m and n is 4.

In the formula (II), p is an integer of 1 to 2, and q is an integer of 0 to 1, wherein the sum of p and q is 2. In a case where m or p is 2 or more, two or more Xs may be the same or different, but all of them are preferably the same.

Specific examples of the titanium-containing catalyst (a) represented by the general formula (I) include titanium tetrakis(monoethanolaminate), titanium monohydroxytris(triethanolaminate), titanium dihydroxybis(triethanolaminate), titanium trihydroxytriethanolaminate, titanium dihydroxybis(diethanolaminate), titanium dihydroxybis(monoethanolaminate), titanium dihydroxybis(monopropanolaminate), titanium dihydroxybis(N-methyldiethanolaminate), titanium dihydroxybis (N-butyldiethanolaminate), a reaction product of tetrahydroxytitanium and N,N,N',N'-tetrahydroxyethylethylenediamine, and intramolecular or intermolecular polycondensates thereof.

Examples of the intramolecular or intermolecular polycondensates include compounds represented by the following general formulas (I-1), (I-2), and (I-3).

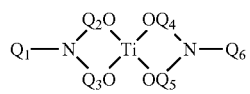
(I-1)

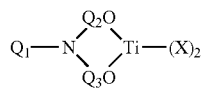
(I-2)

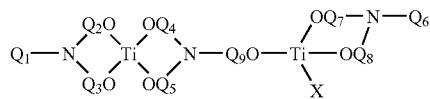
(I-3)

wherein $Q_1$ and $Q_6$ are each H or an alkyl or hydroxyalkyl group having 1 to 4 carbon atoms, $Q_2$ to $Q_5$ and $Q_7$ to $Q_9$ are each an alkylene group having 1 to 6 carbon atoms, and X is a residue formed by removing H of one OH group from a mono- or poly-alkanolamine having 2 to 12 carbon atoms.

Specific examples of the titanium-containing catalyst (a) represented by the general formula (II) include titanyl bis (triethanolaminate), titanyl bis(diethanolaminate), titanyl bis (monoethanolaminate), titanyl hydroxyethanolaminate, titanyl hydroxytriethanolaminate, titanyl ethoxytriethanolaminate, titanyl isopropoxytriethanolaminate, and intramolecular or intermolecular polycondensates thereof.

Examples of the intramolecular or intermolecular polycondensates include compounds represented by the following general formulas (II-1) and (II-2).

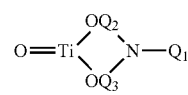
(II-1)

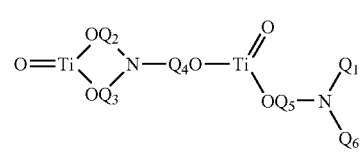
(II-2)

wherein $Q_1$ and $Q_6$ are each H or an alkyl or hydroxyalkyl group having 1 to 4 carbon atoms, and $Q_2$ to $Q_5$ are each an alkylene group having 1 to 6 carbon atoms.

Among them, titanium dihydroxybis(triethanolaminate), an intramolecular polycondensate of titanium dihydroxybis (triethanolaminate) (represented by the following formula (a1)), an intermolecular polycondensate of titanium dihydroxybis (triethanolaminate) (represented by the following formula (a3)), titanium dihydroxybis(diethanolaminate), titanium monohydroxytris(triethanolaminate), an intramolecular polycondensate of titanium monohydroxytris(triethanolaminate) (represented by the following formula (a2)), titanium tetrakis(ethanolaminate), titanyl hydroxytriethanolaminate, titanyl bis(triethanolaminate), and mixtures of two or more of them are preferred, and titanium dihydroxybis (triethanolaminate), titanium monohydroxytris(triethanolaminate), and their intramolecular polycondensates (represented by the following formulas (a1) and (a2)) are more preferred, and an intramolecular polycondensate of titanium dihydroxybis (triethanolaminate) (represented by the following formula (a1)) is particularly preferred.

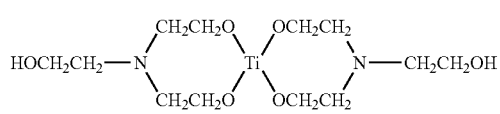
(a1)

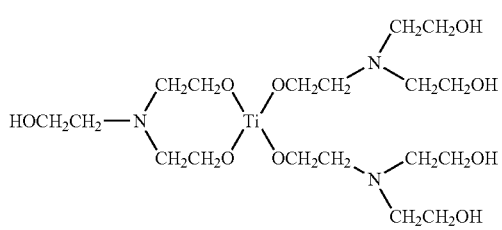
(a2)

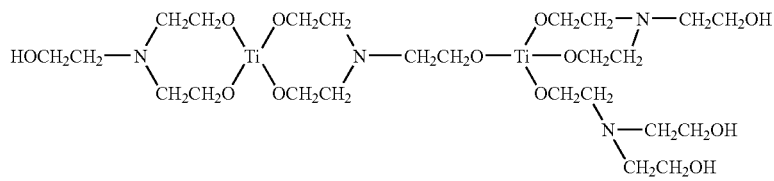

(a3)

Such a titanium-containing catalyst (a) can be stably obtained by, for example, reacting a titanium dialkoxybis (alcoholaminate) (commercially available from, for example, DuPont) in the presence of water at 70 to 90° C. The polycondensate thereof can be obtained by further removing condensation water at 100° C. by reduced-pressure distillation.

Examples of the polycondensation polyester resin constituting the toner binder according to the present invention include a polyester resin (AX) which is a polycondensate of polyol and polycarboxylic acid and a modified polyester resin (AY) obtained by further reacting the polyester resin (AX) with polyepoxide (c). These resins (AX) and (AY) can be used singly or in combination of two or more of them.

Examples of the polyol include diols (g) and tri- or higher-hydric polyols (h). These polyols may be used in combination of two or more of them. Examples of the polycarboxylic acid include dicarboxylic acids (i) and tri- or higher-valent polycarboxylic acids (j). These polycarboxylic acids may be used in combination of two or more of them.

Examples of the polyester resins (AX) and (AY) include the following polyester resins (AX1), (AX2), and (AY1), and these polyester resins (AX1), (AX2), and (AY1) may be used in combination of two or more of them.

(AX1): linear polyester resins produced using (g) and (i)

(AX2): non-linear polyester resins produced using (h) and/or (j) together with (g) and (i)

(AY1): modified polyester resins produced by reacting (AX2) with (c)

The diol (g) preferably has a hydroxyl value of 180 to 1900 (mgKOH/g, hereinafter the same shall apply). Specific examples of the diol (g) include alkylene glycols having 2 to 36 carbon atoms (e.g., ethylene glycol, 1,2-propylene glycol, 1,3-propylene glycol, 1,4-butylene glycol, and 1,6-hexanediol); alkylene ether glycols having 4 to 36 carbon atoms (e.g., diethylene glycol, triethylene glycol, dipropylene glycol, polyethylene glycol, polypropylene glycol, and polybutylene glycol); alicyclic diols having 6 to 36 carbon atoms (e.g., 1,4-cyclohexanedimethanol and hydrogenated bisphenol A); adducts of the alicyclic diols with a C2 to C4 alkylene oxide (e.g., ethylene oxide (hereinafter abbreviated as "EO"), propylene oxide (hereinafter abbreviated as "PO"), butylene oxide (hereinafter abbreviated as "BO")) (number of moles added: 1 to 30); and adducts of bisphenols (e.g., bisphenol A, bisphenol F, bisphenol S) with a C2 to C4 alkylene oxide (e.g., EO, PO, BO) (number of moles added: 2 to 30).

Among these diols, alkylene glycols having 2 to 12 carbon atoms, alkylene oxide adducts of bisphenols, and mixtures of two or more of them are preferred, and alkylene oxide adducts of bisphenols, alkylene glycols having 2 to 4 carbon atoms, and mixtures of two or more of them are particularly preferred.

It is to be noted that the hydroxyl value and acid value mentioned in the above and following descriptions are measured by the methods defined in JIS K 0070.

The tri- or higher-hydric (tri- to octa- or higher-hydric) polyol (h) preferably has a hydroxyl value of 150 to 1900. Specific examples of the polyol (h) include tri- to octa- or higher-hydric aliphatic alcohols having 3 to 36 carbon atoms (e.g., alkanepolyols and their intramolecular or intermolecular dehydration products, such as glycerin, triethylolethane, trimethylolpropane, pentaerythritol, sorbitol, sorbitan, polyglycerin, and dipentaerythritol); sugars and derivatives thereof (e.g., sucrose and methyl glycoside); adducts of the aliphatic polyhydric alcohols with a C2 to C4 alkylene oxide (e.g., EO, PO, BO) (number of moles added: 1 to 30); adducts of trisphenols (e.g., trisphenol PA) with a C2 to C4 alkylene oxide (e.g., EO, PO, BO) (number of moles added: 2 to 30); and adducts of novolac resins (e.g., phenol novolac and cresol novolac, average polymerization degree: 3 to 60) with a C2 to C4 alkylene oxide (e.g., EO, PO, BO) (number of moles added: 2 to 30).

Among these polyols, tri- to octa- or higher-hydric aliphatic alcohols and alkylene oxide adducts of novolac resins (number of moles added: 2 to 30) are preferred, and alkylene oxide adducts of novolac resins are particularly preferred.

The dicarboxylic acid (i) preferably has an acid value of 180 to 1250 (mgKOH/g, hereinafter the same shall apply). Specific examples of the dicarboxylic acid (i) include alkanedicarboxylic acids having 4 to 36 carbon atoms (e.g., succinic acid, adipic acid, and sebacic acid) and alkenylsuccinic acids having 4 to 36 carbon atoms (e.g., dodecenylsuccinic acid); alicyclic dicarboxylic acids having 4 to 36 carbon atoms (e.g., dimer acid (dimerized linoleic acid)); alkenedicarboxylic acids having 4 to 36 carbon atoms (e.g., maleic acid, fumaric acid, citraconic acid, and mesaconic acid); and aromatic dicarboxylic acids having 8 to 36 carbon atoms (e.g., phthalic acid, isophthalic acid, terephthalic acid, and naphthalene dicarboxylic acid). Among these dicarboxylic acids, alkenedicarboxylic acids having 4 to 20 carbon atoms and aromatic dicarboxylic acids having 8 to 20 carbon atoms are preferred. It is to be noted that the acid anhydrides and lower alkyl (C1 to C4) esters (e.g., methyl ester, ethyl ester, and isopropyl ester) of the above-mentioned dicarboxylic acids (i) may also be used.

The tri- or higher-valent (tri- to hexa- or higher-valent) polycarboxylic acid (j) preferably has an acid value of 150 to 1250 mg. Specific examples of the polycarboxylic acid (j) include aromatic polycarboxylic acids having 9 to 20 carbon atoms (e.g., trimellitic acid and pyromellitic acid); and vinyl polymers of unsaturated carboxylic acids (number average molecular weight (hereinafter, referred to as "Mn") measured by gel permeation chromatography (GPC): 450 to 10000) (e.g., styrene/maleic acid copolymer, styrene/acrylic acid copolymer, α-olefin/maleic acid copolymer, and styrene/fumaric acid copolymer). Among them, aromatic polycarboxylic acids having 9 to 20 carbon atoms are preferred, and trimellitic acid and pyromellitic acid are particularly preferred. It is to be noted that the acid anhydrides and lower alkyl (C1 to C4) esters (e.g., methyl ester, ethyl ester, isopropyl ester) of the above-mentioned tri- or higher-valent polycarboxylic acids (j) may also be used.

The diol (g), polyol (h), dicarboxylic acid (i), and polycarboxylic acid (j) may be copolymerized with an aliphatic or aromatic hydroxycarboxylic acid (k) having 4 to 20 carbon atoms and/or a lactone (l) having 6 to 12 carbon atoms.

Examples of the hydroxycarboxylic acid (k) include hydroxystearic acid and hydrogenated castor oil fatty acid. An example of the lactone (l) includes caprolactone.

Examples of the polyepoxide (c) include polyglycidyl ethers (e.g., ethylene glycol diglycidyl ether, tetramethylene glycol diglycidyl ether, bisphenol A diglycidyl ether, bisphenol F diglycidyl ether, glycerine triglycidyl ether, pentaerythritol tetraglycidyl ether, and glycidyl-etherified phenol novolac (average polymerization degree: 3 to 60); and diene oxides (e.g., pentadiene dioxide and hexadiene dioxide). Among them, polyglycidyl ethers are preferred, and ethylene glycol diglycidyl ether and bisphenol A diglycidyl ether are more preferred.

The number of epoxy groups per molecule of the polyepoxide (c) is preferably 2 to 8, more preferably 2 to 6, particularly preferably 2 to 4.

The epoxy equivalent of the polyepoxide (c) is preferably to 500. The lower limit thereof is more preferably 70, particularly preferably 80, and the upper limit thereof is more preferably 300, particularly preferably 200. When the number of epoxy groups and the epoxy equivalent of the polyepoxide (c) are within their respective ranges described above, a resultant toner has both good developing properties and fixing properties. It is more preferred that both the number of epoxy groups per molecule and the epoxy equivalent of the polyepoxide (c) fall within their respective ranges described above.

The reaction ratio between the polyol and the polycarboxylic acid, which is expressed as the equivalent ratio of hydroxyl group [OH] to carboxyl group [COOH] (i.e., [OH]/[COOH]), is preferably 2/1 to 1/2, more preferably 1.5/1 to 1/1.3, particularly preferably 1.3/1 to 1/1.2. Further, the polyol and the polycarboxylic acid to be used are selected also in consideration of molecular weight adjustment so that a finally prepared polyester-based toner binder can have a glass transition temperature of 45 to 85° C.

A toner binder for full color toners and a toner binder for monochrome toners are required to have different physical properties from each other, and therefore the design of a polyester resin is different between them.

More specifically, a toner binder for full color toners is required to have low viscosity because full-color images need to be rich in gloss, whereas a toner binder for monochrome toners is required to have high elasticity because, although monochrome images do not particularly need to be glossy, hot offset properties are regarded as important.

In order to obtain high-gloss images valuable for full-color copiers and the like, the polyester resin (AX1), (AX2), (AY1), or a mixture of two or more of them is preferably used for a toner binder. In this case, since the toner binder preferably has a low viscosity, the proportion of (h) and/or (j) constituting these polyester resins is determined so that the sum of the number of moles of (h) and the number of moles of (j) becomes preferably 0 to 20 mol %, more preferably 0 to 15 mol %, particularly preferably 0 to 10 mol %, with respect to the total number of moles of (g) to (j).

In order to achieve high hot offset resistance valuable for monochrome copiers and the like, the polyester resin (AX2), (AY1), or a mixture thereof is preferably used for a toner binder. In this case, since the toner binder preferably has high elasticity, a polyester resin produced using both (h) and (j) is particularly preferably used. The proportion of the (h) and (j) is determined so that the sum of the number of moles of (h) and the number of moles of (j) becomes preferably 0.1 to 40 mol %, more preferably 0.5 to 25 mol %, particularly preferably 1 to 20 mol %, with respect to the total number of moles of (g) to (i).

In the case of the toner binder for full color toners, the temperature (TE) of the polyester resin, at which the complex viscosity coefficient ($\eta^*$) thereof becomes 100 Pa·s, is preferably 90 to 170° C., more preferably 100 to 165° C., particularly preferably 105 to 150° C. When the TE is 170° C. or less, a resultant full-color image has a sufficient gloss, and when the TE is 90° C. or higher, a resultant toner has good thermal resistant storage stability.

The temperature TE of a resin can be determined by, for example, melt-kneading a resin at 130° C. and 70 rpm for 30 minutes using a Labo Plastomill to prepare a block of the resin and then measuring the complex viscosity coefficient ($\eta^*$) of the resin block using a commercially available dynamic mechanical analysis instrument while the temperature of the resin is changed.

From the viewpoint of gloss level, the tetrahydrofuran (THF)-insoluble matter content of the polyester resin for full color toners is preferably 10% or less, more preferably 5% or less.

In the above and following descriptions, "%" means "% by weight" unless otherwise specified.

It is to be noted the THF-insoluble matter content and THF-soluble matter content of the polyester resin can be determined by the following method.

About 0.5 g of a sample is precisely weighed and placed in a 200 mL stoppered Erlenmeyer flask, and 50 mL of THF is added thereto. Then, the mixture is stirred under reflux for 3 hours, cooled, and filtered using a glass filter to remove insoluble matter. The THF-insoluble matter content (%) of the sample is calculated from the weight ratio between the weight of the resin fraction remaining on the glass filter determined by drying it at 80° C. for 3 hours under reduced pressure and the weight of the sample.

The thus obtained filtrate is used as THF-soluble matter in molecular weight measurement which will be described later.

In the case of the polyester resin for monochrome toners, from the viewpoint of hot offset resistance, the temperature (TG), at which the storage modulus (G') of the polyester resin becomes 6000 Pa, is preferably 130 to 230° C., more preferably 140 to 230° C., particularly preferably 150 to 230° C.

The temperature TG of a resin can be determined by, for example, melt-kneading a resin at 130° C. and 70 rpm for 30 minutes using a Labo Plastomill to prepare a block of the resin and then measuring the storage modulus (G') of the resin block using a commercially available dynamic mechanical analysis instrument while the temperature of the resin is changed.

From the viewpoint of low-temperature fixing ability and thermal resistant storage stability, the temperature (TE) of the polyester resin for monochrome toners, at which the complex viscosity coefficient ($\eta^*$) thereof becomes 1000 Pa·s, is preferably 80 to 140° C., more preferably 90 to 135° C., particularly preferably 105 to 130° C.

The THF-insoluble matter content of the polyester resin for monochrome toners is preferably 2 to 70%, more preferably 5 to 60%, particularly preferably 10 to 50%. When the THF-insoluble matter content is 2% or higher, a resultant toner has good hot offset resistance, and when the THF-insoluble matter content is 70% or less, a resultant toner has good low-temperature fixing ability.

In both cases of the toner binder for full color toners and the toner binder for monochrome toners, the peak top molecular weight (Mp) of the polyester resin is preferably in the range of 1000 to 30000, more preferably in the range of 1500 to 25000, particularly preferably in the range of 1800 to 20000. When the Mp is 1000 or higher, a resultant toner has good thermal resistant storage stability and powder flowability, and when the Mp is 30000 or less, a resultant toner has improved pulverizability and therefore the productivity of the toner is improved.

The ratio of components having a molecular weight of 1500 or less contained in the polyester resin is preferably 1.8% or less, more preferably 1.3% or less, particularly preferably 1.1% or less. When the ratio of components having a molecular weight of 1500 or less is 1.8% or less, a resultant toner has improved storage stability.

In a case where a toner is produced using the toner binder (A) comprising the polyester resin according to the present invention, the ratio of components having a molecular weight of 1500 or less contained in the toner is preferably 1.8% or less, more preferably 1.3% or less, particularly preferably 1.1% or less. When the ratio of components having a molecular weight of 1500 or less is 1.8% or less, the storage stability of the toner is further improved.

The Mp, Mn, and ratio of components having a molecular weight of 1500 or less of a polyester resin or toner mentioned in the above and following descriptions are measured by subjecting THF-soluble matter to GPC under the following conditions.

Apparatus: HLC-8120 manufactured by Tosoh Corporation
Columns: TSK gel GMHXL (two columns), TSK gel Multipore HXL-M (one column)
Measuring temperature: 40° C.
Sample solution: 0.25% THF solution
Volume of solution injected: 100 μL
Detector: Refractive index detector
Reference material: Polystyrene The molecular weight corresponding to the maximum peak height on an obtained chromatogram is referred to as a "peak top molecular weight (Mp)". Further, the ratio of low-molecular weight components present in the sample is evaluated based on the peak area ratio of the chromatogram divided into two parts at the point corresponding to a molecular weight of 1500.

In both cases of the toner binder for full color toners and the toner binder for monochrome toners, the acid value of the polyester resin is preferably 0.1 to 60, more preferably to 50, particularly preferably 0.5 to 40. When the acid value of the polyester resin is in the range of 0.1 to 60, a resultant toner has good electrostatic properties.

In both cases of the toner binder for full color toners and the toner binder for monochrome toners, the hydroxyl value of the polyester resin is preferably 1 to 70, more preferably 3 to 60, particularly preferably 5 to 55. When the hydroxyl value of the polyester resin is in the range of 1 to 70, a resultant toner has good environmental stability.

In both cases of the toner binder for full color toners and the toner binder for monochrome toners, the Tg of the polyester resin is preferably 40 to 90° C., more preferably 50 to 80° C., particularly preferably 55 to 75° C. When the Tg of the polyester resin is in the range of 40 to 90° C., a resultant toner has good thermal resistant storage stability and low-temperature fixing ability.

It is to be noted that the Tg of the polyester resin mentioned in the above and following descriptions is measured according to a method (DSC method) defined in ASTM D3418-82 using DSC20, SSC/580 manufactured by Seiko Instruments Inc.

The polyester resin to be used in the present invention as a toner binder (A) can be produced in the same manner as a conventional polyester production method. For example, the polyester resin can be produced by carrying out reaction in the presence of a titanium-containing catalyst (a) in an atmosphere of inert gas (e.g., nitrogen gas) at a reaction temperature of preferably 150 to 280° C., more preferably 160 to 250° C., particularly preferably 170 to 240° C. From the viewpoint of reliably carrying out polycondensation reaction, the reaction time is preferably 30 minutes or more, particularly preferably 2 to 40 hours. Reduction in pressure (e.g., 1 to 50 mmHg) is also effective to increase the reaction rate in the last stage of the reaction.

From the viewpoint of polymerization activity, the amount of (a) to be added is preferably in the range of 0.0001 to 0.8%, more preferably in the range of 0.0002 to 0.6%, particularly preferably in the range of 0.0015 to 0.55%, with respect to the weight of a polymer to be obtained.

Another esterification catalyst can be used together with (a) unless the catalytic effect of (a) is impaired. Examples of said another esterification catalyst include tin-containing catalysts (e.g., dibutyltin oxide), antimony trioxide, titanium-containing catalysts other than (a) (e.g., titanium alkoxides, titanyl potassium oxalate, and titanium terephthalate), zirconium-containing catalysts (e.g., zirconyl acetate), germanium-containing catalysts, alkali (alkaline earth) metal catalysts (e.g., carboxylic acid salts of alkali metals or alkaline earth metals: lithium acetate, sodium acetate, potassium acetate, calcium acetate, sodium benzoate, and potassium benzoate), and zinc acetate. The amount of said another esterification catalyst to be added is preferably in the range of 0 to 0.6% with respect to the amount of a polymer to be obtained. When the amount of the esterification catalyst to be added is 0.6% or less, a resultant polyester resin is less colored and is therefore preferably used for color toners. The ratio of the titanium-containing catalyst (a) to all the catalysts added is preferably 50 to 100%.

An example of a method for producing a linear polyester resin (AX1) includes a method in which a diol (g) and a dicarboxylic acid (i) are heated to 180 to 260° C. in the presence of a catalyst (a) in an amount of 0.0001 to 0.8% of the weight of a polymer to be obtained and, if necessary, another catalyst to subject them to dehydration and condensation under normal pressure and/or reduced pressure conditions to obtain (AX1)

An example of a method for producing a non-linear polyester resin (AX2) includes a method in which a diol (g), a dicarboxylic acid (i), and a tri- or higher-hydric polyol (h) are heated to 180 to 260° C. in the presence of a catalyst (a) in an amount of 0.0001 to 0.8% of the weight of a polymer to be obtained and, if necessary, another catalyst to subject them to dehydration and condensation under normal pressure and/or reduced pressure conditions, and a tri- or higher-valent polycarboxylic acid (j) is added to allow the reaction to further proceed to obtain (AX2). The polycarboxylic acid (j) may be simultaneously reacted with (g), (i), and (h).

An example of a method for producing a modified polyester resin (AY1) includes a method in which a polyepoxide (c) is added to a polyester resin (AX2) to subject the polyester resin to elongation reaction at 180 to 260° C. to obtain (AY1).

The acid value of (AX2) to be reacted with (c) is preferably 1 to 60, more preferably 5 to 50. When the acid value of (AX2) is 1 or more, there is not a fear that unreacted (c) remains and adversely affects the performance of a resultant resin, and when the acid value of (AX2) is 60 or less, a resultant resin has good thermal stability.

From the viewpoint of low-temperature fixing ability and hot offset resistance, the amount of (c) to be used for obtaining (AY1) is preferably in the range of 0.01 to 10%, more preferably in the range of 0.05 to 5%, with respect to the amount of (AX2)

If necessary, the toner binder (A) according to the present invention may contain another resin in addition to the polycondensation polyester resin described above.

Examples of another resin include styrene-based resins (e.g., styrene/alkyl(meth)acrylate copolymers and styrene/diene-based monomer copolymers), epoxy resins (e.g., ring-opening polymerization products of bisphenol A diglycidyl ether), and urethane resins (e.g., polyaddition products of diol and/or tri- or higher-hydric polyol and diisocyanate).

The weight-average molecular weight of another resin is preferably in the range of 1000 to 2000000.

The amount of another resin contained in the toner binder (A) is preferably in the range of 0 to 40%, more preferably in the range of 0 to 30%, particularly preferably in the range of 0 to 20%.

In a case where two or more polyester resins are used together or at least one polyester resin is mixed with another resin, they may be mixed in powder form or melt-mixed beforehand, or may be mixed during the production of a toner.

In the case of melt-mixing, they are preferably mixed at a temperature of 80 to 180° C., more preferably 100 to 170° C., particularly preferably 120 to 160° C.

If the temperature of melt-mixing is too low, there is a case where they cannot be sufficiently and uniformly mixed. If two or more polyester resins are mixed at too high a temperature, there is a case where averaging due to transesterification occurs and therefore they cannot maintain their resin physical properties required of a toner binder.

The mixing time of melt-mixing is preferably 10 seconds to 30 minutes, more preferably 20 seconds to 10 minutes, particularly preferably 30 seconds to 5 minutes. If two or more polyester resins are mixed for too long a time, there is a case where averaging due to transesterification occurs and therefore they cannot maintain their resin physical properties required of a toner binder.

Examples of a mixing apparatus to be used for melt-mixing include a batch-type mixing apparatus such as a reaction vessel and a continuous mixing apparatus. In order to carry out uniform melt-mixing at a proper temperature in a short time, a continuous mixing apparatus is preferably used. Examples of such a continuous mixing apparatus include extruders, continuous kneaders, and three-roll mills. Among them, extruders and continuous kneaders are preferred.

In the case of powder mixing, they can be mixed using a conventional mixing apparatus under conventional mixing conditions. As for mixing conditions in powder mixing, the mixing temperature is preferably 0 to 80° C., more preferably 10 to 60° C., and the mixing time is preferably 3 minutes or more, more preferably 5 to 60 minutes. Examples of the mixing apparatus include a Henschel mixer, a Nauta mixer, and a Banbury mixer. Among them, a Henschel mixer is preferred.

The toner for developing electrostatic images according to the present invention includes the toner binder (A) according to the present invention and a colorant (B), and, if necessary, further includes one or more of various additives such as a mold release agent (C), a charge control agent (D), and a fluidizing agent (E).

In a case where a dye or pigment is used as a colorant, the toner binder (A) content of the toner is preferably in the range of 70 to 98%, more preferably in the range of 74 to 96%. In a case where a magnetic powder is used, the toner binder (A) content of the toner is preferably in the range of 20 to 85%, more preferably in the range of 35 to 65%.

As the colorant (B), a well-known dye, pigment, or magnetic powder can be used, and specific examples thereof include carbon black, sudan black SM, fast yellow G, benzidine yellow, pigment yellow, indofast orange, irgazin red, paranitroaniline red, toluidine red, carmine FB, pigment orange R, lake red 2G, rhodamine FB, rhodamine B lake, methyl violet B lake, phthalocyanine blue, pigment blue, brilliant green, phthalocyanine green, oil yellow GG, Kayaset YG, Orasol brown B, oil pink OP, magnetite, and iron black.

In a case where a dye or pigment is used, the colorant (B) content of the toner is preferably in the range of 2 to 15%. In a case where a magnetic powder is used, the colorant (B) content of the toner is preferably in the range of 15 to 70%, more preferably in the range of 30 to 60%.

Examples of the mold release agent (C) include carnauba wax (C1), Fischer-Tropsch wax (C2), paraffin wax (C3), and polyolefin wax (C4).

Examples of (C1) include natural carnauba wax and free fatty acid removed-type carnauba wax.

Examples of (C2) include petroleum Fischer-Tropsch waxes (e.g., Paraflint H1, Paraflint H1N4, and Paraflint C105 manufactured by Shumann-Sasol Ltd.), natural gas-based Fischer-Tropsch waxes (e.g., FT100 manufactured by Shell MDS), and waxes obtained by purifying these Fischer-Tropsch waxes by, for example, fractional crystallization (e.g., MDP-7000 and MDP-7010 manufactured by Nippon Seiro Co., Ltd.).

Examples of (C3) include petroleum wax-based paraffin waxes (e.g., paraffin waxes HNP-5, HNP-9, and HNP-11 manufactured by Nippon Seiro Co., Ltd.).

Examples of (C4) include polyethylene waxes (e.g., Sanwax 171P and Sanwax LEL400P manufactured by Sanyo Chemical Industries) and polypropylene waxes (e.g., Viscol 550P and Viscol 660P manufactured by Sanyo Chemical Industries).

Among these waxes, carnauba waxes and Fischer-Tropsch waxes are preferred, and carnauba waxes and petroleum Fischer-Tropsch waxes are more preferred. By using such a wax as a mold release agent, it is possible to obtain a toner having excellent low-temperature fixing ability.

The mold release agent (C) content of the toner is preferably in the range of 0 to 10%, more preferably in the range of 1 to 7%.

Examples of the charge control agent (D) include nigrosine dyes, quaternary ammonium salt compounds, quaternary ammonium base-containing polymers, metal-containing azo dyes, salicylic acid metal salts, sulfonic acid group-containing polymers, fluorine-containing polymers, and halogen-substituted aromatic ring-containing polymers.

The charge control agent (D) content of the toner is preferably in the range of 0 to 5%, more preferably in the range of 0.01 to 4%.

Examples of the fluidizing agent (E) include well-known ones such as colloidal silica, alumina powder, titanium oxide powder, and calcium carbonate powder.

The fluidizing agent (E) content of the toner is preferably in the range of 0 to 5%.

As a method for producing the toner, a well-known kneading and pulverizing method can be mentioned. More specifically, the above-mentioned constituents of the toner are dry-blended, melt-kneaded, pulverized using a jet mill or the like, and air-classified so that particles usually having a particle size D50 of 2 to 20 µm are obtained.

It is to be noted that the particle size D50 can be measured using a Coulter counter (e.g., Multisizer III (trade name) manufactured by Coulter).

If necessary, the toner according to the present invention using the toner binder according to the present invention is blended with carrier particles such as a magnetic powder (e.g., iron powder, nickel powder, ferrite, magnetite), glass beads and/or ferrite whose surface is coated with a resin (e.g., acrylic resin, silicone resin) to be used as an electric latent image developer. It is also possible for the toner to form electric latent images by friction with a member such as a charging blade instead of by using carrier particles.

Then, the toner is fixed as a recording material to a support (e.g., paper, polyester film) by, for example, a well-known heat roll fixing method.

EXAMPLES

Hereinbelow, the present invention will be further described with reference to the following examples, but is not limited to these examples. In the following description, "part(s)" means "part(s) by weight".

It is to be noted that the softening point mentioned in the following examples and comparative examples was measured by the following method.

Softening Point Measuring Method

By using a flow tester, a sample is heated at a constant rate under the following conditions, and a temperature, at which the amount of outflow of the sample becomes ½, is defined as a softening point.

Apparatus: Flow tester CFT-500D (manufactured by Shimadzu Corporation)
Load: 20 kgf/cm$^2$
Die: 1 mmΦ–1 mm
Rate of temperature rise: 6° C./min
Amount of sample: 1.0 g Production Example 1

Synthesis of Titanium-Containing Catalyst (a)

In a reaction vessel equipped with a cooling tube, a stirrer, a nitrogen introduction tube capable of being used for bubbling of a liquid phase with nitrogen, 1617 parts of titanium diisopropoxybis(triethanolaminate) and 126 parts of ion-exchanged water were placed, gradually heated to 90° C. while being bubbled with nitrogen, and subjected to reaction (hydrolysis) at 90° C. for 4 hours to obtain titanium dihydroxybis(triethanolaminate). Further, the thus obtained titanium dihydroxybis(triethanolaminate) was subjected to reaction (dehydration and condensation) at 100° C. for 2 hours under reduced pressure to obtain an intramolecular polycondensate (a1).

Other titanium-containing catalysts (a) to be used in the present invention can be synthesized in the same manner as in the Production Example 1.

Example 1

Synthesis of Linear Polyester Resin

In a reaction vessel equipped with a cooling tube, a stirrer, a nitrogen introduction tube, 430 parts of an adduct of bisphenol A with 2 moles of PO, 300 parts of an adduct of bisphenol A with 3 moles of PO, 257 parts of terephthalic acid, 65 parts of isophthalic acid, 10 parts of maleic anhydride, and 2 parts of titanium dihydroxybis(triethanolaminate) as a condensation catalyst were placed, and were then subjected to reaction at 220° C. for 10 hours under a nitrogen stream while generated water was distilled off. Then, the reaction was further allowed to proceed under a reduced pressure of 5 to 20 mmHg, and then a reaction product was taken out of the reaction vessel when the acid value of the reaction product reached 5. The reaction product was cooled to room temperature and then pulverized to obtain a linear polyester resin (AX1-1).

The linear polyester resin (AX1-1) contained no THF-insoluble matter, and had an acid value of 7, a hydroxyl value of 12, a Tg of 60° C., an Mn of 6940, and an Mp of 19100. The ratio of components having a molecular weight of 1500 or less was 1.2%.

Synthesis of Non-Linear Polyester Resin

In a reaction vessel equipped with a cooling tube, a stirrer, and a nitrogen introduction tube, 350 parts of an adduct of bisphenol A with 2 moles of EO, 326 parts of an adduct of bisphenol A with 3 moles of PO, 278 parts of terephthalic acid, 40 parts of phthalic anhydride, and 2 parts of titanium dihydroxybis(triethanolaminate) as a condensation catalyst were placed, and were then subjected to reaction at 230° C. for 10 hours under a nitrogen stream while generated water was distilled off. Further, the reaction was allowed to proceed under a reduced pressure of 5 to 20 mmHg, and when the acid value of a reaction product reached 2 or less, the reaction product was cooled to 180° C. and 62 parts of trimellitic anhydride was added thereto to carry out reaction at normal pressure under sealed conditions for 2 hours. Then, a reaction product was taken out of the reaction vessel, cooled to room temperature, and pulverized to obtain a non-linear polyester resin (AX2-1)

The non-linear polyester resin (AX2-1) contained no THF-insoluble matter, and had an acid value of 35, a hydroxyl value of 17, a Tg of 69° C., an Mn of 3920, and an Mp of 11200. The ratio of components having a molecular weight of 1500 or less was 0.9%.

<Synthesis of Toner Binder>

400 parts of (AX1-1) and 600 parts of (AX2-1) were melt-mixed using a continuous kneader at a jacket temperature of 150° C. for 3 minutes to obtain a molten resin. The molten resin was cooled to 30° C. in 4 minutes using a steel belted cooler, and was then pulverized to obtain a toner binder (TB1) according to the present invention.

Example 2

Synthesis of Liner Polyester Resin

Reaction was carried out in the same manner as in the case of (AX1-1) in the Example 1 except that the polycondensation catalyst was changed to titanyl bis(triethanolaminate), and then a reaction product was cooled to room temperature and pulverized to obtain a linear polyester resin (AX1-2).

The liner polyester resin (AX1-2) contained no THF-insoluble matter, and had an acid value of 8, a hydroxyl value of 10, a Tg of 60° C., an Mn of 6820, and an Mp of 20180. The ratio of components having a molecular weight of 1500 or less was 1.1%.

<Synthesis of Non-Linear Polyester Resin>

Reaction was carried out in the same manner as in the case of (AX2-1) in the Example 1 except that the polycondensation catalyst was changed to titanyl bis(triethanolaminate), and then a reaction product was cooled to room temperature and pulverized to obtain a linear polyester resin (AX2-2).

The linear polyester resin (AX2-2) contained no THF-insoluble matter, and had an acid value of 33, a hydroxyl value of 14, a Tg of 70° C., an Mn of 4200, and an Mp of 11800. The ratio of components having a molecular weight of 1500 or less was 0.8%.

<Synthesis of Toner Binder>

500 parts of the polyester (AX1-2) and 500 parts of the polyester (AX2-2) were mixed in powder form with the use of a Henschel mixer for 5 minutes to obtain a toner binder resin (TB2) according to the present invention.

Example 3

Synthesis of Linear Polyester Resin

Reaction was carried out in the same manner as in the case of (AX1-1) in the Example 1 except that the polycondensation catalyst was changed to the intramolecular polycondensate (a1) mentioned above, and then a reaction product was cooled to room temperature and pulverized to obtain a linear polyester resin (AX1-3).

The polyester resin (AX1-3) contained no THF-insoluble matter, and had an acid value of 7, a hydroxyl value of 11, a Tg of 60° C., an Mn of 6860, and an Mp of 20100. The ratio of components having a molecular weight of 1500 or less was 0.9%.

<Synthesis of Non-Linear Polyester Resin>

Reaction was carried out in the same manner as in the case of (AX2-1) in the Example 1 except that the polycondensation catalyst was changed to the intramolecular polycondensate (a1) mentioned above, and then a reaction product was cooled to room temperature and pulverized to obtain a linear polyester resin (AX2-3).

The polyester resin (AX2-3) contained no THF-insoluble matter, and had an acid value of 33, a hydroxyl value of 15, and a Tg of 70° C., an Mn of 4320, and an Mp of 11950. The ratio of components having a molecular weight of 1500 or less was 0.8%.

<Synthesis of Toner Binder>

500 parts of the polyester (AX1-3) and 500 parts of the polyester (AX2-3) were mixed in powder form with the use of a Henschel mixer for 5 minutes to obtain a toner binder resin (TB3) according to the present invention.

Comparative Example 1

Synthesis of Comparative Linear Polyester Resin

Reaction was carried out in the same manner as in the case of (AX1-1) in the Example 1 except that the polycondensation catalyst was changed to titanium tetraisopropoxide. However, the reaction stopped halfway due to the deactivation of the catalyst and no more generated water distilled, and therefore 2 parts of titanium tetraisopropoxide was further added 4 times in the course of the reaction to obtain a comparative linear polyester resin (CAX1-1).

The polyester resin (CAX1-1) contained no THF-insoluble matter, and had an acid value of 7, a hydroxyl value of 12, a Tg of 58° C., an Mn of 6220, and an Mp of 18900. The ratio of components having a molecular weight of 1500 or less was 2.2%.

<Synthesis of Comparative Non-Linear Polyester Resin>

Reaction was carried out in the same manner as in the case of (AX2-1) in the Example 1 except that the polycondensation catalyst was changed to titanium tetraisopropoxide. The reaction was carried out under normal pressure for 16 hours and under reduced pressure for 8 hours. The rate of reaction was slow, and therefore 2 parts of titanium tetrapropoxide was further added 3 times in the course of the reaction to obtain a comparative non-linear polyester resin (CAX2-1).

The polyester resin (CAX2-1) contained no THF-insoluble matter, and had an acid value of 34, a hydroxyl value of 16, a Tg of 68° C., an Mn of 3420, and an Mp of 12100. The ratio of components having a molecular weight of 1500 or less was 2.1%.

<Synthesis of Comparative Toner Binder>

400 parts of (CAX1-1) and 600 parts of (CAX2-1) were melt-mixed using a continuous kneader at a jacket temperature of 150° C. for 3 minutes to obtain a molten resin. The molten resin was cooled to 30° C. in 4 minutes using a steel belted cooler, and was then pulverized to obtain a comparative toner binder (CTB1). The toner binder (CTB1) was a resin having a deep purplish-brown color.

Evaluation Examples 1 to 3 and Comparative Evaluation Example 1

100 parts of each of the toner binders (TB1) to (TB3) according to the present invention and the comparative toner binder (CTB1) was pre-mixed with 5 parts of carnauba wax and 4 parts of a yellow pigment (toner yellow HG VP2155 manufactured by Clariant) using a Henschel mixer (FM10B manufactured by Mitsui Miike Kakoki K.K.) to obtain a mixture, and then the mixture was kneaded using a biaxial kneader (PCM-30 manufactured by Ikegai Ltd.). Then, the kneaded mixture was pulverized using a supersonic jet pulverizer (Labojet manufactured by Nippon Pneumatic MFG. Co., Ltd.), and was then classified using an air classifier (MDS-I manufactured by Nippon Pneumatic MFG. Co., Ltd.) to obtain toner particles having a particle size D50 of 8 μm. Then, 100 parts of the toner particles were mixed with 0.5 part of colloidal silica (Aerosil R972 manufactured by Nippon Aerosil Co., Ltd.) using a sample mill. In this way, toners (T1) to (T3) and a comparative toner (CT1) were obtained.

The thus obtained toners were evaluated by the following evaluation methods, and the evaluation results are shown in Table 1.

<Evaluation Methods>

(1) Gloss Appearance Temperature (Gloss)

30 parts of the toner and 800 parts of a ferrite carrier (F-150 manufactured by Powdertech Co., Ltd.) were uniformly mixed to prepare a two-component developer for evaluation. Unfixed images developed using the developer and a commercially available copier (AR5030 manufactured by Sharp Corporation) were fixed at a process speed of 120 mm/sec using a fixing apparatus obtained by modifying a fixing unit of a commercially available printer (LBP2160 manufactured by Cannon Inc.) so that the temperature of a heat roller was variable. The temperature of a fixing roll, at which the 60° gloss value of the fixed image became 10% or more when measured using a commercially available glossmeter (gmx-202-60 manufactured by MURAKAMI COLOR RESEARCH LABORATORY), was defined as a gloss appearance temperature.

(2) Hot Offset Occurrence Temperature (Hot)

Fixing was carried out in the same manner as in the case of the above GLOSS evaluation, and the occurrence or nonoccurrence of hot offset on the fixed image was visually observed. The temperature of the fixing roll, at which hot offset occurred, was defined as a hot offset occurrence temperature.

(3) Test of Toner's Anti-Blocking Property-1

Each of the developers prepared in the above (1) was conditioned under a high temperature and humidity environment (i.e., at 50° C. and 85% R.H.) for 48 hours, and under the same environment, the developer was visually observed to check to see whether blocking occurred or not. Further, copies were produced using the developer and a commercially available copier (AR5030 manufactured by Sharp Corporation), and the image quality of the copies was evaluated.

Criteria

⊙: No blocking of toner was recognized and image quality was good.

◯: No blocking of toner was recognized but image quality was slightly deteriorated after 1000-sheet copying.

Δ: Blocking of toner was visually recognized and image quality was deteriorated after 1000-sheet copying.

x: Blocking of toner was visually recognized and image formation became impossible before 1000-sheet copying.

(4) Test of Toner's Anti-Blocking Property-2

Each of the developers prepared in the above (1) was conditioned under a high temperature and humidity environment (i.e., at 50° C. and 85% R.H.) for 120 hours, and the conditions of the developer and the image quality of copies were observed in the same manner as in the above (3) and evaluated according to the same criteria as described above.

TABLE 1

|  | Toner | GLOSS (° C.) | HOT (° C.) | Anti-blocking property-1 | Anti-blocking property-2 |
|---|---|---|---|---|---|
| Evaluation Example 1 | (T1) | 130 | 200 or higher | ⊙ | ◯ |
| Evaluation Example 2 | (T2) | 130 | 200 or higher | ⊙ | ◯ |
| Evaluation Example 3 | (T3) | 130 | 200 or higher | ⊙ | ⊙ |
| Comparative Evaluation Example 1 | (CT1) | 130 | 200 or higher | Δ | X |

The polycondensation catalyst (a) used in the present invention had excellent catalytic activity, and therefore as described above, the amount of low-molecular weight components having a molecular weight of 1500 or less was reduced.

As can be seen from the results shown in Table 1, the toner according to the present invention has good low-temperature fixing properties and does not cause blocking even under high temperature and humidity conditions.

Example 4

Synthesis of Modified Polyester Resin

In a reaction vessel equipped with a cooling tube, a stirrer, and a nitrogen introduction tube, 549 parts of an adduct of bisphenol A with 2 moles of propylene oxide, 20 parts of an adduct of bisphenol A with 3 moles of propylene oxide, 133 parts of an adduct of bisphenol A with 2 moles of ethylene oxide, 10 parts of an adduct of phenol novolac (average polymerization degree: about 5) with 5 moles of ethylene oxide, 252 parts of terephthalic acid, 19 parts of isophthalic acid, 10 parts of trimellitic anhydride, and 2 parts of titanium dihydroxybis(diethanolaminate) as a condensation catalyst were placed, and were then subjected to reaction at 230° C. for 10 hours under a nitrogen stream while generated water was distilled off. Further, the reaction was allowed to proceed under a reduced pressure of 5 to 20 mmHg until the acid value of a reaction product reached 2 or less. Then, 50 parts of trimellitic anhydride was added thereto to carry out reaction under normal pressure for 1 hour and then under a reduced pressure of 20 to 40 mmHg, and when the softening point of a reaction product reached 105° C., 20 parts of bisphenol A diglycidyl ether was added. When the softening point of a reaction product reached 150° C., the reaction product was taken out of the reaction vessel, cooled to room temperature, and pulverized to obtain a modified polyester resin (AY1-1).

The polyester resin (AY1-1) had an acid value of 52, a hydroxyl value of 16, a Tg of 73° C., an Mn of 1860, an Mp of 6550, and a THF-insoluble matter content of 32%. The ratio of components having a molecular weight of 1500 or less was 1.0%. The polyester resin (AY1-1) was used as a toner binder (TB4)

Example 5

Synthesis of Modified Polyester Resin

Reaction was carried out in the same manner as in the case of (AY1-1) in the Example 4 except that the polycondensation catalyst was changed to titanyl hydroxy(triethanolaminate), and then a reaction product was cooled to room temperature and pulverized to obtain a linear polyester resin (AY1-2).

The polyester resin (AY1-2) had an acid value of 52, a hydroxyl value of 16, a Tg of 73° C., an Mn of 1820, an Mp of 6530, and a THF-insoluble matter content of 31%. The ratio of components having a molecular weight of 1500 or less was 1.0%. The polyester resin (AY1-2) was used as a toner binder (TB5)

Example 6

Synthesis of Modified Polyester Resin

Reaction was carried out in the same manner as in the case of (AY1-1) in the Example 4 except that the polycondensation catalyst was changed to titanium tetrakis (ethanolaminate), and then a reaction product was cooled to room temperature and pulverized to obtain a linear polyester resin (AY1-3).

The polyester resin (AY1-3) had an acid value of 52, a hydroxyl value of 17, a Tg of 73° C., an Mn of 1850, an Mp of 6560, and a THF-insoluble matter content of 33%. The ratio of components having a molecular weight of 1500 or less was 1.2%. The polyester resin (AY1-3) was used as a toner binder (TB6)

Example 7

Synthesis of Modified Polyester Resin

Reaction was carried out in the same manner as in the case of (AY1-1) in the Example 4 except that the polycondensation catalyst was changed to the intramolecular polycondensate (a1) mentioned above, and then a reaction product was cooled to room temperature and pulverized to obtain a linear polyester resin (AY1-4).

The polyester resin (AY1-4) had an acid value of 51, a hydroxyl value of 16, a Tg of 74° C., an Mn of 1870, an Mp of 6610, and a THF-insoluble matter content of 34%. The ratio of components having a molecular weight of 1500 or less was 0.8%. The polyester resin (AY1-4) was used as a toner binder (TB7)

Example 8

Synthesis of Modified Polyester Resin

Reaction was carried out in the same manner as in the case of (AY1-1) in the Example 4 except that the polycondensation catalyst was changed to the intramolecular polycondensate (a2) mentioned above, and then a reaction product was cooled to room temperature and pulverized to obtain a linear polyester resin (AY1-5).

The polyester resin (AY1-5) had an acid value of 49, a hydroxyl value of 17, a Tg of 73° C., an Mn of 1830, an Mp of 6510, and a THF-insoluble matter content of 33%. The ratio of components having a molecular weight of 1500 or less was 1.1%. The polyester resin (AY1-5) was used as a toner binder (TB8)

Example 9

Synthesis of Modified Polyester Resin

Reaction was carried out in the same manner as in the case of (AY1-1) in the Example 4 except that the polycondensation catalyst was changed to the intramolecular polycondensate (a3) mentioned above, and then a reaction product was cooled to room temperature and pulverized to obtain a linear polyester resin (AY1-6).

The polyester resin (AY1-6) had an acid value of 50, a hydroxyl value of 17, a Tg of 73° C., an Mn of 1840, an Mp of 6530, and a THF-insoluble matter content of 33%. The ratio of components having a molecular weight of 1500 or less was 1.1%. The polyester resin (AY1-6) was used as a toner binder (TB9)

Comparative Example 2

Synthesis of Comparative Modified Polyester Resin

Reaction was carried out in the same manner as in the Example 3 except that the polycondensation catalyst was changed to titanium tetrabutoxide to obtain a comparative modified polyester resin (CAY1-2).

The polyester resin (CAY1-2) had a softening point of 150° C., an acid value of 53, a hydroxyl value of 17, a Tg of 71° C., an Mn of 1660, and an Mp of 6340, and a THF-insoluble matter content of 34%. The ratio of components having a molecular weight of 1500 or less was 3.1%. The polyester resin (CAY1-2) was used as a toner binder (CTB2).

Example 10

Synthesis of Non-Linear Polyester Resin

In a reaction vessel equipped with a cooling tube, a stirrer, and a nitrogen introduction tube, 132 parts of an adduct of bisphenol A with 2 moles of propylene oxide, 371 parts of an adduct of bisphenol A with 3 moles of propylene oxide, 20 parts of an adduct of bisphenol A with 2 moles of ethylene oxide, 125 parts of an adduct of phenol novolac (average polymerization degree: about 5) with 5 moles of propylene oxide, 201 parts of terephthalic acid, 25 parts of maleic anhydride, 35 parts of dimethyl terephthalate, and 2 parts of titanyl bis(triethanolaminate) as a condensation catalyst were placed, and were then subjected to reaction at 230° C. for 10 hours under a nitrogen stream while generated water was distilled off. Then, the reaction was further allowed to proceed under a reduced pressure of 5 to 20 mmHg, and when the acid value of a reaction product reached 2 or less, the reaction product was cooled to 180° C. and then 65 parts of trimellitic anhydride was added thereto to carry out reaction at normal pressure under sealed conditions for 2 hours. Then, a reaction product was taken out of the reaction vessel, cooled to room temperature, and pulverized to obtain a non-linear polyester resin (AX2-3).

The non-linear polyester resin (AX2-3) had a softening point of 144° C., an acid value of 30, a hydroxyl value of 16, a Tg of 59° C., an Mn of 1410, an Mp of 4110, a THF-insoluble matter content of 27%. The ratio of components having a molecular weight of 1500 or less was 1.0%. The polyester resin (AX2-3) was used as a toner binder (TB10).

Example 11

Synthesis of Non-Linear Polyester Resin

In a reaction vessel equipped with a cooling tube, a stirrer, and a nitrogen introduction tube, 410 parts of an adduct of bisphenol A with 2 moles of propylene oxide, 270 parts of an adduct of bisphenol A with 3 moles of propylene oxide, 110 parts of terephthalic acid, 125 parts of isophthalic acid, 15 parts of maleic anhydride, and 2 parts of titanium dihydroxybis(triethanolaminate) as a condensation catalyst were placed, and were then subjected to reaction at 220° C. for 10 hours under a nitrogen stream while generated water was distilled off. Then, the reaction was further allowed to proceed under a reduced pressure of 5 to 20 mmHg, and when the acid value of a reaction product reached 2 or less, the reaction product was cooled to 180° C. and then 25 parts of trimellitic anhydride was added thereto to carry out reaction at normal pressure under sealed conditions for 2 hours. Then, a reaction product was taken out of the reaction vessel, cooled to room temperature, and pulverized to obtain a non-linear polyester resin (AX2-4).

The polyester resin (AX2-4) contained no THF-insoluble matter, and had an acid value of 18, a hydroxyl value of 37, a Tg of 62° C., an Mn of 2130, and an Mp of 5350. The ratio of components having a molecular weight of 1500 or less was 1.3%.

<Synthesis of Modified Polyester Resin>

In a reaction vessel equipped with a cooling tube, a stirrer, and a nitrogen introduction tube, 317 parts of an adduct of bisphenol A with 2 moles of ethylene oxide, 57 parts of an adduct of bisphenol A with 2 moles of propylene oxide, 298 parts of an adduct of bisphenol A with 3 moles of propylene oxide, 75 parts of an adduct of phenol novolac (average polymerization degree: about 5) with 5 moles of propylene oxide, 30 parts of isophthalic acid, 157 parts of terephthalic acid, 27 parts of maleic anhydride, and 2 parts of titanium dihydroxybis(triethanolaminate) as a condensation catalyst were placed, and were then subjected to reaction at 230° C. for 10 hours under a nitrogen stream while generated water was distilled off. Then, the reaction was further allowed to proceed under a reduced pressure of 5 to 20 mmHg, and when the acid value of a reaction product reached 2 or less, the reaction product was cooled to 180° C. and then 68 parts of trimellitic anhydride was added thereto to carry out reaction under normal pressure for 1 hour and then under a reduced pressure of 20 to 40 mmHg. When the softening point of a reaction product reached 120° C., 25 parts of bisphenol A diglycidyl ether was added, and when the softening point of a reaction product reached 155° C., the reaction product was taken out of the reaction vessel, cooled to room temperature, and pulverized to obtain a modified polyester resin (AY1-7).

The polyester resin (AY1-7) had an acid value of 11, a hydroxyl value of 27, a Tg of 60° C., an Mn of 3020, an Mp of 6030, a THF-insoluble matter content of 35%. The ratio of components having a molecular weight of 1500 or less was 1.1%.

<Synthesis of Toner Binder>

500 parts of (AX2-4) and 500 parts of (AY1-7) were melt-mixed using a continuous kneader at a jacket temperature of 150° C. for 3 minutes to obtain a molten resin. The molten resin was cooled to 30° C. in 4 minutes using a steel belted cooler and then pulverized to obtain a toner binder (TB11) according to the present invention.

Evaluation Examples 4 to 11 and Comparative Evaluation Example 2

100 parts of each of the toner binders (TB4) to (TB11) according to the present invention and the comparative toner binder (CTB2) was pre-mixed with 8 parts of carbon black (MA-100 manufactured by Mitsubishi Chemical Corporation), 5 parts of carnauba wax, and 1 part of charge control agent (T-77 manufactured by Hodogaya Chemical Co., Ltd.) using a Henschel mixer (FM10B manufactured by Mitsui Miike Kakohki K.K.) to obtain a mixture, and then the mixture was kneaded using a biaxial kneader (PCM-30 manufactured by Ikegai Ltd.). Then, the kneaded mixture was pulverized using a supersonic jet pulverizer (Labojet manufactured by Nippon Pneumatic MFG. Co., Ltd.), and was then classified using an air classifier (MDS-I manufactured by Nippon Pneumatic MFG. CO., Ltd.) to obtain toner particles having a particle size D50 of 9 µm. Then, 100 parts of the toner particles were mixed with 0.3 part of colloidal silica (Aerosil R972 manufactured by Nippon Aerosil Co., Ltd.) using a sample mill. In this way, toners (T4) to (T11) and a comparative toner (CT2) were obtained.

The thus obtained toners were evaluated by the following evaluation methods, and the evaluation results are shown in Table 2.

<Evaluation methods>

(1) Minimum Fixing Temperature (MFT)

30 parts of the toner and 800 parts of a ferrite carrier (F-150 manufactured by Powdertech Co., Ltd.) were uniformly mixed to obtain a two-component developer for evaluation. Unfixed images developed using the developer and a commercially available copier (AR5030 manufactured by Sharp Corporation) were fixed at a process speed of 145 mm/sec using a fixing apparatus obtained by modifying a fixing unit of a commercially available copier (SF8400A manufactured by Sharp Corporation) so that the temperature of a heat roller was variable. The temperature of a fixing roller, at which the residual ratio of image density after rubbing of the fixed image with a pad became 70% or more, was defined as a minimum fixing temperature.

(2) Hot Offset Occurrence Temperature (Hot)

Fixing was carried out in the same manner as in the case of the above MFT evaluation, and the occurrence or nonoccurrence of hot offset on the fixed image was visually observed. The temperature of the fixing roll, at which hot offset occurred, was defined as a hot offset occurrence temperature.

(3) Test of Toner's Anti-Blocking Property-1

Each of the developers prepared in the above (1) was conditioned in a high temperature and humidity environment (i.e., at 50° C. and 85% R.H.) for 48 hours, and in the same environment, the developer was visually observed to check to see whether blocking occurred or not. Further, copies were produced using the developer and a commercially available copier (AR5030 manufactured by Sharp Corporation), and the image quality of the copies was evaluated.

The evaluation was made according to the same criteria as described above.

(4) Test of Toner's Anti-Blocking Property-2

Each of the developers prepared in the above (1) was conditioned in a high temperature and humidity environment (i.e., at 50° C. and 85% R.H.) for 120 hours, and the conditions of the developer and the image quality of copies were observed in the same manner as in the above (3) and evaluated according to the same criteria as described above.

TABLE 2

| | Toner | MFT (° C.) | HOT (° C.) | Anti-blocking property-1 | Anti-blocking property-2 |
|---|---|---|---|---|---|
| Evaluation Example 4 | (T4) | 140 | 225 | ○ | ○ |
| Evaluation Example 5 | (T5) | 140 | 225 | ⊙ | ○ |
| Evaluation Example 6 | (T6) | 135 | 225 | ○ | ○ |
| Evaluation Example 7 | (T7) | 135 | 230 | ⊙ | ⊙ |
| Evaluation Example 8 | (T8) | 130 | 225 | ⊙ | ○ |
| Evaluation Example 9 | (T9) | 140 | 225 | ○ | ○ |
| Evaluation Example 10 | (T10) | 135 | 225 | ⊙ | ○ |
| Evaluation Example 11 | (T11) | 130 | 230 | ⊙ | ○ |
| Comparative Evaluation Example 2 | (CT2) | 140 | 210 | X | X |

The polycondensation catalyst (a) used in the present invention had excellent catalytic activity, and therefore as described above, the amount of low-molecular weight components having a molecular weight of 1500 or less was reduced.

Further, as can be seen from the results shown in Table 2, the toner according to the present invention has good low-temperature fixing properties and does not cause blocking even under high temperature and humidity conditions.

INDUSTRIAL APPLICABILITY

The toner binder according to the present invention can impart both excellent anti-blocking property under high temperature and humidity conditions and low-temperature fixing properties to a toner, and therefore the toner according to the present invention containing the toner binder according to the present invention is useful as a toner for developing electrostatic images.

What is claimed is:

1. A toner binder for developing electrostatic images, comprising a polycondensation polyester resin produced in the presence of at least one titanium-containing catalyst (a) represented by the following general formula (I) or (II):

$$Ti(-X)_m(-OH)_n \quad (I)$$

$$O=Ti(-X)_p(-OR)_q \quad (II)$$

wherein X is a residue formed by removing H of one OH group from a mono- or poly-alkanolamine having 2 to 12 carbon atoms, wherein in the case of a polyalkanolamine, the other OH group or each of one or more of other OH groups may be intramolecularly polycondensed with another OH group directly bound to the same Ti atom, to which the residue is bound, to form a ring structure, or, alternatively, or simultaneously when two or more of other OH groups are incorporated, may be intermolecularly polycondensed with an OH group directly bound to a Ti atom of another molecule to form a structure containing two or more Ti atoms at a polymerization degree of 2 to 5; R is H or a C1 to C8 alkyl group which may have 1 to 3 ether bonds; m is an integer of 1 to 4, n is an integer of 0 to 3, and the sum of m and n is 4; p is an integer of 1 to 2, q is an integer of 0 to 1, and the sum of p and q is 2; and when m or p is 2 or more, two or more Xs may be the same or different.

2. The toner binder for developing electrostatic images according to claim 1, wherein X in the general formula (I) or (II) is a residue formed by removing H of one OH group from a mono-, di-, or tri-alkanolamine.

3. The toner binder for developing electrostatic images according to claim 1, wherein m or p in the general formula (I) or (II) is 2 or more, and wherein all of two or more Xs are the same group.

4. The toner binder for developing electrostatic images according to claim 1, wherein the titanium-containing catalyst (a) is at least one selected from catalysts having the following general formulas (I-1) to (I-3):

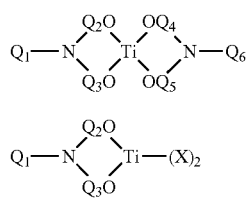

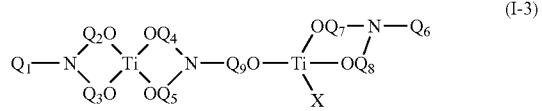

where $Q_1$ and $Q_6$ are each H or an alkyl or hydroxyalkyl group having 1 to 4 carbon atoms; $Q_2$ to $Q_5$ and $Q_7$ to $Q_8$ are each an alkylene group having 1 to 6 carbon atoms; and X is a residue formed by removing H of one OH group from a mono- or poly-alkanolamine having 2 to 12 carbon atoms.

5. The toner binder for developing electrostatic images according to claim 1, wherein at least part of the polyester resin is modified with a polyepoxide (c).

6. A toner for developing electrostatic images, comprising the toner binder (A) for developing electrostatic images according to claim 1 and a colorant (B).

7. The toner for developing electrostatic images according to claim 6, further comprising at least one additive selected from a mold release agent (C), a charge control agent (D), and a fluidizing agent (E).

8. The toner binder for developing electrostatic images according to claim 4, wherein at least part of the polyester resin is modified with a polyepoxide (c).

* * * * *

UNITED STATES PATENT AND TRADEMARK OFFICE
CERTIFICATE OF CORRECTION

Page 1 of 1

PATENT NO. : 7,862,972 B2
APPLICATION NO. : 12/293181
DATED : January 4, 2011
INVENTOR(S) : Naoki Takase It is certified that error appears in the above-identified patent and that said Letters Patent is hereby corrected as shown below:

In the Claims:

At Col. 24, line 10 (in Claim 4), replace "$Q_7$ to $Q_g$" with --$Q_7$ to $Q_9$--.

Signed and Sealed this
Twenty-first Day of June, 2011

David J. Kappos
*Director of the United States Patent and Trademark Office*